SOLID STATE QUANTUM MECHANICAL TUNNELING APPARATUS

Filed July 5, 1963 2 Sheets-Sheet 1

INVENTOR.
GEORGE J. UNTERKOFLER
BY Carl Fissell Jr.
AGENT

INVENTOR.
GEORGE J. UNTERKOFLER
BY Carl Fissell Jr.
AGENT

United States Patent Office 3,277,313

Patented Oct. 4, 1966

3,277,313

SOLID STATE QUANTUM MECHANICAL TUNNELING APPARATUS

George J. Unterkofler, Malvern, Pa., assignor to Burroughs Corporation, Detroit, Mich., a corporation of Michigan Filed July 5, 1963, Ser. No. 293,084
12 Claims. (Cl. 307—88.5)

The present invention relates to solid state electron apparatus and, more particularly, to solid state electron apparatus employing the quantum mechanical tunneling effect in a manner effecting the production and control of electrons. With still more specificity, the invention has to do with apparatus employing the quantum mechanical tunneling effect between discrete areas of conductive material disposed adjacent to an electrically insulating member in a manner whereby electrons may be emitted, e.g., into atmospheric air and/or emitted and collected in the manner of a vacuum tube by a conductive anode member or plate.

It is an object of the present invention to provide solid state electron apparatus employing quantum mechanical tunneling to cause electrons to be emitted into atmospheric air.

Another object of the invention is to provide quantum mechanical tunneling electron emissive apparatus including means for controlling electron emissivity and/or collecting electrons emitted thereby.

Still another object is to provide solid state quantum mechanical tunneling-amplifying apparatus.

In accordance with the foregoing objects and first briefly described, the present invention comprises one or more electrically conductive areas arranged in random distribution upon an electrically insulating substrate and including means for applying an electrical potential thereto effective to cause electron migration from one area to another by the mechanism of quantum mechanical tunneling. Oppositely disposed substantially parallel spaced apart electrical field producing members are arranged normal to the plane of said conductive areas and on opposite sides thereof so as to straddle said conductive areas. Means is provided for applying an electrical potential to said field producing members effective to establish an electrical field through said conductive areas whereby electrons tunneling from one conductive area to another are attracted to one of said field producing members thereby providing a source of free electrons.

An additional feature of the present invention is the provision of means for controlling the emissivity of said electron emissive members thereby to provide an effective amplifying device.

For a complete disclosure of the invention, a detailed description thereof will be given in connection with the accompanying drawings and claims forming part of the specification wherein:

FIGS. 1 through 4 inclusive represent greatly enlarged idealized schematic illustrations of the progressive deposition of conductive material on an insulating member;

Figure 1:
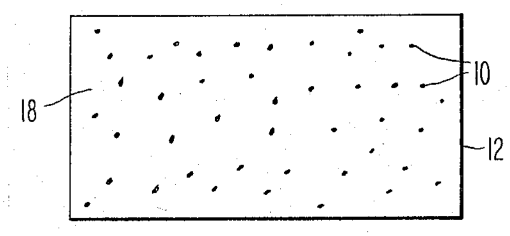
Figure 2:
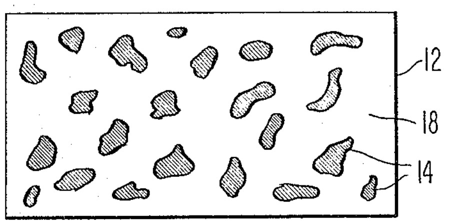
Figure 3:
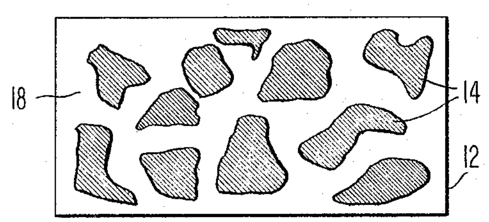
Figure 4:
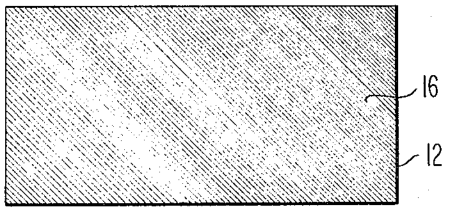

It has been observed and noted that when electrically conductive films are deposited onto insulating substrats, such as glass, ceramic, salt single crystals etc., e.g., by vacuum evaporation the film generally forms initially, into small groups of depositing metal atoms which, as seen in FIG. 1, condense at nucleation points 10 on an insulating substrate 12. The density of these nucleation points and physical ordering of the atoms in each island can be controlled through judicious selection of substrate material, substrate temperatures, deposition rate and evaporant material. Ensuing metal atoms in the vapor stream migrate over the substrate surface until they contact one of the nucleation points where they condense, as in FIG. 2, onto the initial metal atoms which formed the nucleation points 10, FIG. 1. In this manner small islands 14 of the depositing conductive material are formed and grow as more and more of the metal vapor reaches the substrate. If the deposition is continued for a sufficient length of time these islands of deposited metal continue their growth and start combining into larger and larger islands until finally, a continuous metal film 16 has been formed, as shown in FIG. 4. If the electrical conductivity of these films is measured from the beginning of the deposition procedure, it is observed that these films have a definite conductance long before the continuous metal film 16 has formed. The explanation for the transport of electrons from one metal island 14 to another when there is an insulator 12 therebetween is explainable on the basis of the mechanism of quantum mechanical tunneling. Thus electrons are caused to migrate from one island 14 through its surface potential barrier, then into the empty or free space 18 between the islands 14 where they are accelerated to an adjacent metal island 14 which absorbs and repeats the process.

The net affect is that electrons are transported through this ultrathin film of metal islands 14. The acceleration of electrons while travelling between islands is caused by an electric field hereinafter described, which is applied across the film.

It is important to note that electrons actually move through the film of islands for a finite time as "free" electrons. This occurs when the electrons are accelerated in the free space 18 between the metal islands 14. The face that there are free electrons for a period of time suggests that if a vertical electric field is applied the electrons will be accelerated vertically at the same time they are travelling horizontally. Thus a sufficiently intense vertical electric field will permit the collection of the tunneling electrons or a major portion of them, by means of the vertical electric field. The amount of net gain that can be realized in such a device will depend in large measure on the ratio of lateral to vertical impedance and the effective current collection made possible by the application of the vertical field.

Figure 5:
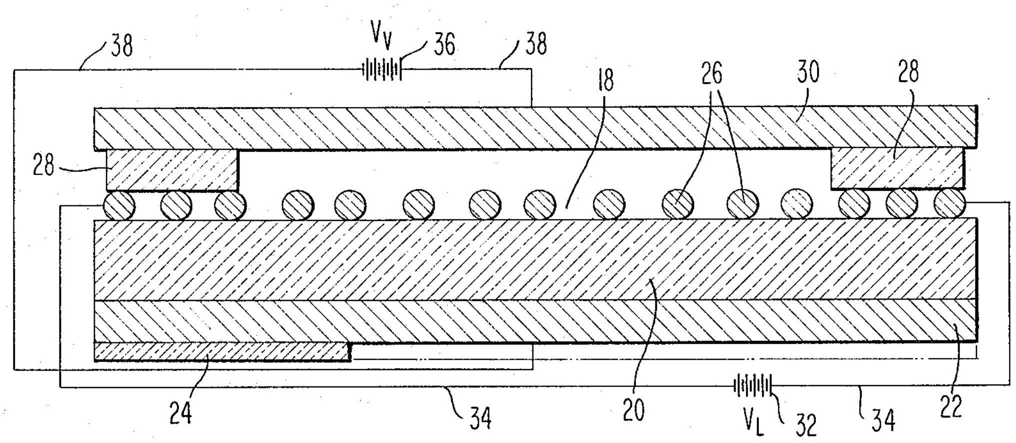
FIG. 5 is an idealized greatly enlarged sectional view of a device employing the present invention.

A structural configuration of a device operating on the basis of the foregoing principle is shown in the idealized illustration of FIG. 5. A planar insulating substrate layer 20 is operably or physically arranged adjacent to a suitably shaped e.g., planar conductor 22 in a manner permitting the conductor 22 to be brought into surface contact therewith. The insulating planar layer 20 could be formed by vacuum deposition of an appropriate insulator material onto the planar conductor 22, which likewise could be formed as the result of suitable evaporation and deposition of conductive material upon an insulating member 24. In this manner the entire assembly could be vacuum deposited as hereinafter described. Conductive material 26, idealized as circles for ease in drawing and illustration, in the following figures of the drawing, is disposed on the surface of the insulating layer 20 in a manner whereby individual "islands" of material are arranged in a random, haphazard or discontinuous fashion so that at least some free spaces 18 are interposed between the various conductive islands 26. Electrically insulating material such for example as an annulus or the parallel spaced apart members 28, is disposed in contact with the conductive islands 26. Thereafter conductive material is deposited to form a planar electrode 30 arranged in spaced apart relationship relative to the conductive islands 26 and in contact with insulation 28. The thickness of the insulating member is large enough to preclude direct quantum mechanical tunneling of electrons from the conductive film 26 to the collecting electrode 30 in the presence of the vertical field required to effect usable collection of electrons from the lateral flow thereof from island to island.

Figure 6:
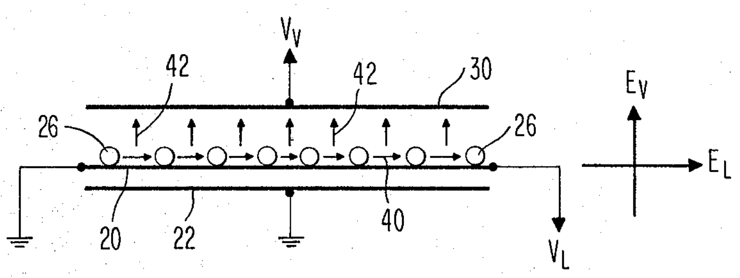
FIG. 6 is a schematic illustration of the electron current flow in accordance with the technology of the present invention.

The laterally or horizontally extending film of conductive islands 26 has applied thereto an electrical potential $V_L$ (lateral voltage) by means, for example, of a battery 32 via leads 34—34. A vertical voltage $V_v$ is applied to the vertical field electrodes 22 and 30 by means of a second battery 36 over leads 38—38. Application of potentials $V_L$ and $V_v$ creates an electrical field as seen in the schematic illustration of FIG. 6, which represents the electron current, arrows 40, migrating horizontally by quantum mechanical tunneling from island 26 to island 26. A portion of electron current, arrows 42, is attracted or forced to move vertically by virtue of the vertical field $E_v$ provided by $V_v$ across the vertical field electrodes 22 and 30. It can be seen that sufficient collection of electrons in the vertical direction enables the device of FIGS. 5 and 7 to serve as a cold cathode emitter.

Figure 7:
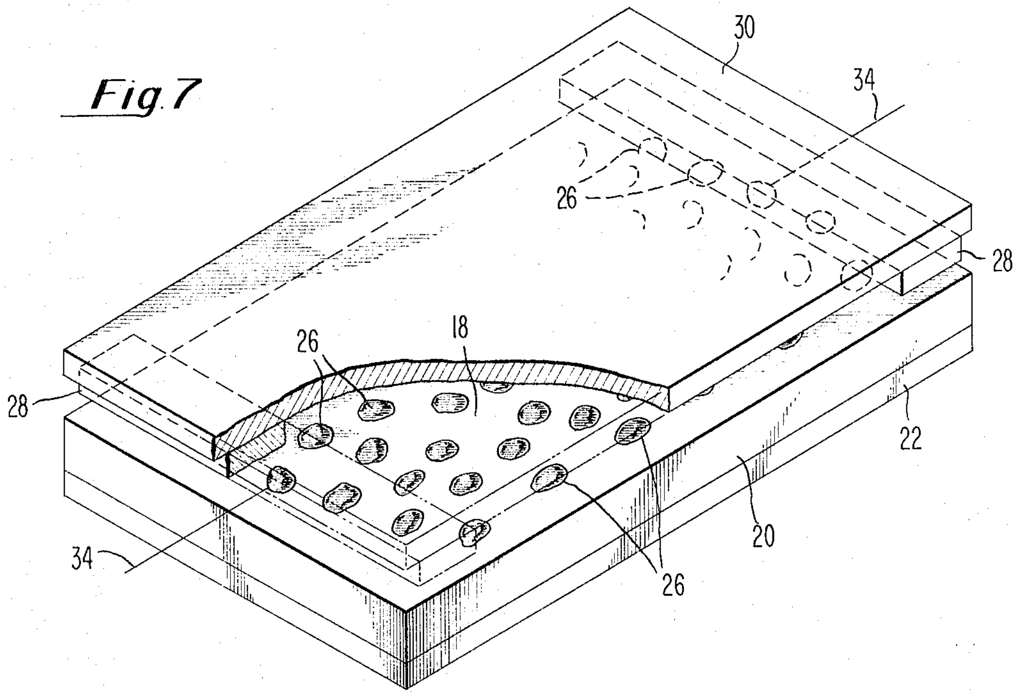
FIG. 7 is an isometric view of the device illustrated in FIG. 5.

The isometric illustration of FIG. 7 serves to illustrate one embodiment of the invention and to show more clearly the relative arrangement of the various conductors and insulating potrions thereof.

Figure 8:
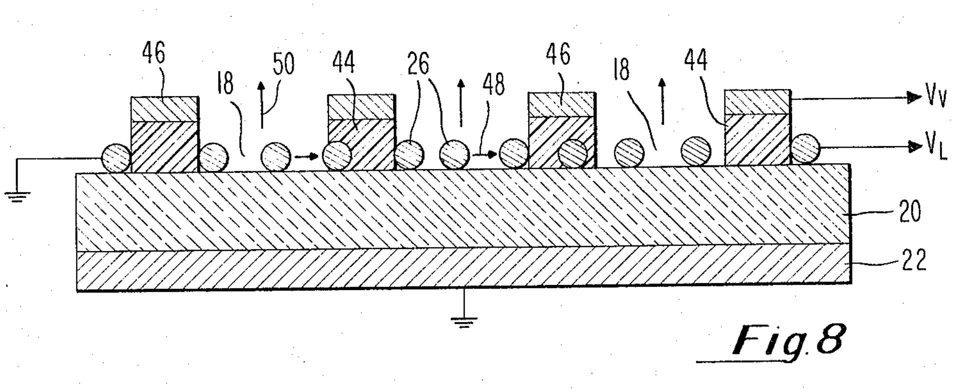
FIG. 8 is a schematic greatly enlarged sectional view of apparatus for producing controlled electron emission in accordance with the teaching of the present invention.

A modified form of the invention is shown in FIG. 8. The substrate 20 is provided with a lower electrode 22 secured or disposed adjacent thereto. The conductive material 26 is or may be applied as before, e.g., vacuum deposition, providing a series of discrete randomly oriented islands or areas 26. The electrode 30 of FIGS. 5 and 7 is replaced oy a grid-like arrangement of insulating material, e.g., members 44 overlayed upon the areas 26. Thereafter a conductive grid 46 is laid down over the insulating grid members 44. The planar conductive member 22 is maintained at earth potential. The vertical accelerating voltage $V_v$ is applied to the upper grid electrodes 44 and the lateral voltage $V_L$ is applied to the islands 26 of conductive material. Quantum mechanical tunneling again causes the electrons to migrate horizontally from one conductive island to another, arrows 48. Free electrons in the spaces 18 between islands are caused to be emitted vertically, arrows 50. This structural arrangement makes it possible to produce controlled electron emission into atmospheric air.

Figure 9:
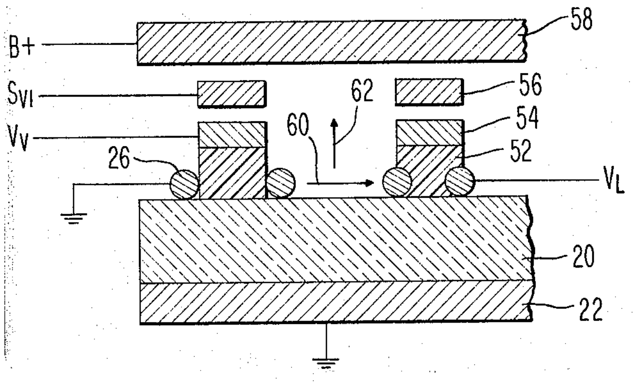
FIG. 9 is a modification of the device of FIG. 8 providing an amplifying appaartus in accordance with the present invention.

A further modification of the invention is shown in FIG. 9. Here the substrate 22 is operably associated with a lower planar electrode 22 as before. A plurality of conductive islands 26 are thereafter deposited or formed on the substrate surface over which an insulating grid 52 is provided and upon which a conductive grid 54 is overlaid as described in connection with the device of FIG. 8. A secondary grid 56 is spaced from the grid 54 and a collecting plate or anode electrode 58 is arranged in space apart relation relative to the upper metallic grid 56. Lateral voltage $V_L$ is applied to the islands of material 26 while the vertical voltage $V_v$ is applied to the first conductive grid 54. Quantum mechanical tunneling from island to island causes electrons to migrate, arrows 60. Free electrons move vertically arrows 62, due to the vertical field from $V_v$. A signal potential $SV_1$ is applied to the grid 56 and operates in the nature of the grid in a thermionic vacuum tube. The vertical component, arrow 62 of the electrons migrating from island to island, arrow 60, is attracted to the plate 58 held at B+ under control of the potential $SV_1$ thereby providing an active amplifying type solid state electron thin film active device whose fabrication is compatible with thin film passive component technology.

The thickness of the insulating layers 20, 44 and 52 would typically be between 500 A. and 2000 A. The magnitude of the voltage $V_v$ required is on the order of a few volts. For insulators 20 and 44 each 1000 A. thick, having a dielectric constant of 5, a voltage $V_v$ of 10 volts will produce a vertical field of about 5 million volts per centimeter at the layer 26. This order of magnitude is required for quantum mechanical tunneling to occur between the islands forming the layer.

Values of the voltage $V_1$ can be quite small since, for example, a layer of gold on glass with an average thickness of 75 A. shows a resistance of about one hundred ohms per square centimeter of area. For a structure 1 millimeter by 1 millimeter square this will give a current of 1 ampere at a voltage $V_1$ equal to one volt. Thus with only a small collection efficiency there can be substantial current flow to the collecting electrode 30 or 58.

As mentioned briefly hereinbefore, the present invention lends itself quite readily to complete fabrication in vacuum, e.g., vacuum deposition. To this end the structures illustrated in FIGS. 5, and 7 through 9 inclusive could each be made entirely as thin film deposited assemblies. For example, in fabricating the device of FIG. 8, the following method can be employed. An insulating member, not shown, but similar to member 24 in FIG. 5, has deposited thereon conductive material forming the member 22 as a thin film of metal. Oxidizing this material produces the insulating layer 20 which may be the self-limiting oxide of the chosen conductive material. Or, silicon monoxide can be deposited to form layer 20. Conductive material is then deposited upon the oxide layer 20 to form the discrete, although discontinuous, randomly arranged islands 26.

As before, this material may then be oxidized to form a self-limiting oxide layer 44 or silicon monoxide, for example, may be deposited thereon to produce this insulation. Conductive material is then controllably deposited through a suitable mask arrangement not shown, to form the grid members 46. Of course, this same method is equally applicable to the structural configuration of FIGS. 5 and 9.

What is claimed is:

1. Solid state electron apparatus comprising,
   (a) one or more discrete areas of conductive material disposed on an insulating support member,
   (b) means applying an electrical potential to said conductive areas effective to cause electron migration from one area to another by means of the quantum mechanical tunneling effect, and
   (c) means establishing an electrical field normal to the plane of said conductive areas effective when energized to attract electrons moving through the free spaces between adjacent conductive areas.
2. Solid state electron apparatus comprising,
   (a) parallel spaced apart confronting electrode members,
   (b) one or more discrete areas of conductive material disposed on an insulating support member intermediate said electrode members,
   (c) means applying an electrical potential to said conductive areas effective to cause electron migration from one area to another by means of the quantum mechanical tunneling effect, and
   (d) means applying an electrical potential to said electrode members establishing an electrical field normal to the plane of said conductive areas effective when energized to attract electrons moving in the free spaces between adjacent conductive areas.
3. Solid state electron apparatus comprising,
   (a) a pair of oppositely disposed, parallel spaced confronting electrode members, (b) one or more discrete areas of conductive material disposed on an insulating support member intermediate said electrode members,
(c) means applying an electrical potential to said conductive areas effective to cause electron migration from one area to another by means of the quantum mechanical tunneling effect, and
(d) means applying an electrical potential to said electrode members establishing an electrical field normal to the plane of said conductive areas effective when energized to attract electrons moving in the free spaces between adjacent conductive areas.

4. Solid state electron apparatus comprising,
(a) an electrically insulating support member having a plurality of discrete, randomly spaced, conductive areas thereon,
(b) means applying an electrical potential to said discrete areas effective to cause electron migration from one discrete area to another discrete area by means of the quantum mechanical tunneling effect,
(c) a conductive member adjacent to said support,
(d) a conductive member adjacent to and electrically isolated from said conductive areas, and
(e) mean applying an electrical potential to said electrodes effective to create an electrical field normal to said conductive areas whereby to attract electrons tunneling from one to another conductive area during movement of said electrons in the free spaces between adjacent conductive areas.

5. Solid state electron apparatus comprising,
(a) an electrically insulating support member having one or more discrete, randomly spaced, conductive areas thereon,
(b) means applying an electrical potential to said discrete areas effective to cause electron migration from one discrete area to another discrete area by means of the quantum mechanical tunneling effect,
(c) planar conductive means adjacent to said support,
(d) planar conductive means adjacent to and electrically isolated from said conductive areas, and
(e) means applying an electrical potential to said planar electrodes effective to create an electrical field normal to said conductive areas whereby to attract electrons tunneling from one conductive area to another conductive area during movement of said electrons in the free spaces between adjacent conductive areas.

6. Solid state electron apparatus comprising,
(a) an electrically insulating support member having a plurality of discrete, randomly spaced, conductive areas thereon,
(b) means applying an electrical potential to said discrete areas effective to cause electron migration from one discrete area to another discrete area by means of the quantum mechanical tunneling effect,
(c) a first planar electrode adjacent to and in contact with said support,
(d) a second planar electrode adjacent to and electrically isolated from said conductive areas, and
(e) means applying an electrical potential to said electrodes effective to create an electrical field normal to said conductive areas thereby to attract electrons tunneling from one conductive area to another conductive area during movement of said electrons in the free spaces between adjacent conductive areas.

7. Solid state electron apparatus comprising,
(a) an electrically insulating support member having a plurality of discrete, randomly spaced, conductive areas thereon,
(b) means applying an electrical potential to said discrete areas effective to cause electron migration from one discrete area to another discrete area by means of the quantum mechanical tunneling effect,
(c) an electrode adjacent to said support, (d) control means arranged in spaced relation thereto and electrically insulated from said conductive areas,
(e) means applying an electrical potential to said electrode and to said control means effective to create an electrical field normal to said conductive areas thereby to attract electrons tunneling from one conductive area to another conductive area during movement of said electrons in the free spaces between adjacent conductive areas.

8. Solid state electron apparatus comprising,
(a) an electrically insulating support member having a plurality of discrete, randomly spaced, conductive areas thereon,
(b) means applying an electrical potential to said discrete areas effective to cause electron migration from one discrete area to another discrete area by means of the quantum mechanical tunneling effect,
(c) an electrode adjacent to said support,
(d) control means electrically insulated from said conductive areas and arranged in spaced apart relation thereto,
(e) further control means adjacent to and spaced from said last control means,
(f) an electrode adjacent to and spaced from said further control means,
(g) means applying an electrical potential to said electrodes effective to create an electrical field normal to said conductive areas whereby to attract electrons tunneling from one of said conductive areas to another conductive area during movement of said electrons in the free spaces between adjacent conductive areas, and
(h) means applying a control potential to said control means for controlling the electron output.

9. The method of fabricating solid state electron apparatus comprising the steps of:
(a) forming a continuous conductive film of material upon an insulating member,
(b) oxidizing said continuous film to form an insulating layer thereon,
(c) forming a discontinuous film layer of conductive material upon said insulating layer,
(d) oxidizing said discontinuous film layer thereby to form an insulating layer thereon thick enough to preclude quantum mechanical tunneling of electrons therethrough,
(e) thereafter forming a continuous conductive film over said insulating layer thereby providing a collecting electrode, and
(f) providing means for applying electrical potentials to said discontinuous and said continuous films respectively whereby through the mechanism of quantum mechanical tunneling of electrons through said discontinuous film electron transfer is produced from said discontinuous film layer to said collecting electrode.

10. The method of fabricating solid state electron apparatus comprising the steps of:
(a) depositing a continuous conductive film of material upon an insulating member,
(b) oxidizing said continuous film to form a self-limited insulating layer thereon,
(c) depositing a discontinuous, randomly arranged film layer of conductive material upon said insulating layer,
(d) oxidizing said discontinuous film layer thereby to form an insulating layer thereon thick enough to preclude quantum mechanical tunneling of electrons therethrough,
(e) thereafter depositing a continuous conductive film over said insulating layer thereby providing a collecting electrode, and
(f) providing means for applying electrical potentials to said discontinuous and said continuous films respectively whereby through the mechanism of quantum mechanical tunneling of electrons through said discontinuous film layer electron transfer is produced from said discontinuous film layer to said collecting electrode.

11. The method of fabricating solid state electron apparatus comprising the steps of:

(a) depositing a continuous conductive film of material upon an insulating member, (b) depositing an insulating layer on said conductive film, (c) depositing a discontinuous film layer of conductive material on said insulating layer, (d) oxidizing said discontinuous film layer thereby to form an insulating layer thereon thick enough to preclude quantum mechanical tunneling of electrons therethrough, (e) thereafter depositing a continuous conductive film over said insulating layer thereby forming a collecting electrode, and (f) providing means for applying electrical potentials to said discontinuous and said continuous films respectively whereby through the mechanism of quantum mechanical tunneling of electrons through said discontinuous film layer electron transfer is produced from said discontinuous film layer to said collecting electrode.

12. The method of fabricating solid state electron apparatus comprising the steps of:

(a) vacuum depositing a continuous conductive film of material upon an insulating member, (b) oxidizing said continuous film to form an insulating layer thereon, (c) vacuum depositing a discontinuous film layer of conductive material upon said insulating layer permitting electron migration therethrough by means of quantum mechanical tunneling, (d) oxidizing said discontinuous film layer thereby to form an insulating layer thereon thick enough to preclude quantum mechanical tunneling of electrodes therethrough, (e) thereafter vacuum depositing a continuous conductive film over said insulating layer thereby producing a collecting electrode, and (f) vacuum vapor depositing means for applying electrical potentials to said discontinuous and said continuous film layers respectively whereby through the mechanism of quantum mechanical tunneling of electrons across said discontinuous film layer electron transfer takes place from said discontinuous film to said collecting electrode.

References Cited by the Examiner

UNITED STATES PATENTS

| | | | |
|---|---|---|---|
| 2,960,659 | 11/1960 | Burton | 330—65 |
| 3,056,073 | 9/1962 | Mead | 317—234 |
| 3,114,070 | 12/1963 | Stratton | 313—346 |
| 3,116,427 | 12/1963 | Giaver | 317—234 X |

JOHN W. HUCKERT, *Primary Examiner.*

A. M. LESNIAK, *Assistant Examiner.*